No. 772,414. PATENTED OCT. 18, 1904.
F. W. HODGES.
VALVE.
APPLICATION FILED MAY 7, 1904.
NO MODEL.
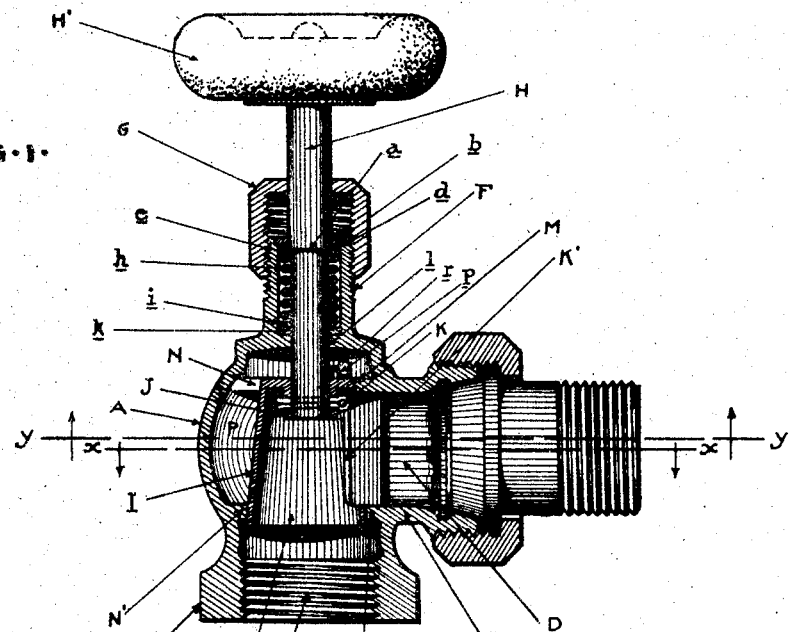
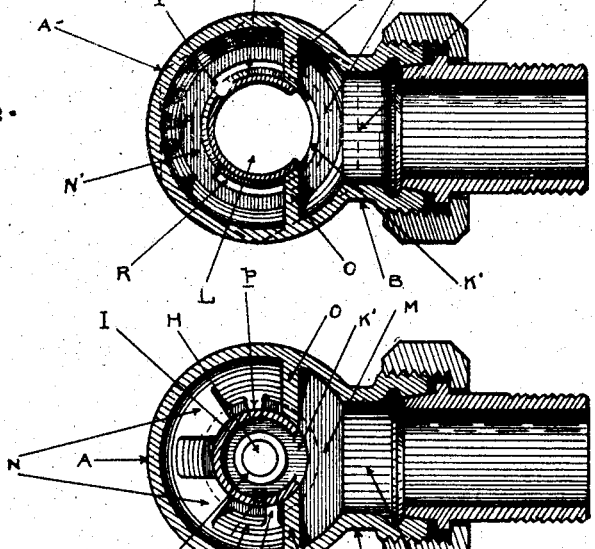
WITNESSES
INVENTOR
FREDERICK W. HODGES
BY James Whittemore
ATT'Y.

No. 772,414.

Patented October 18, 1904.

UNITED STATES PATENT OFFICE.

FREDERICK W. HODGES, OF DETROIT, MICHIGAN.

VALVE.

SPECIFICATION forming part of Letters Patent No. 772,414, dated October 18, 1904.

Application filed May 7, 1904. Serial No. 206,950. (No model.)

*To all whom it may concern:*

Be it known that I, FREDERICK W. HODGES, a citizen of the United States, residing at Detroit, in the county of Wayne and State of Michigan, have invented certain new and useful Improvements in Valves, of which the following is a specification, reference being had therein to the accompanying drawings.

The invention relates to improvements in valves; and it consists in the construction, arrangement, and combination of parts, as hereinafter more fully described, and particularly pointed out in the claims.

In the drawings, Figure 1 is a vertical central longitudinal section through a valve embodying my invention. Fig. 2 is a horizontal section on line $x\,x$, Fig. 1, looking downward; and Fig. 3 is a section on line $y\,y$ looking toward the stem of the valve.

A represents the body of the valve, which in this case I have shown of substantially globular form, having the eduction-nipple B and the inlet or induction nipple C, through which are the eduction passage or port D and the induction passage or port E. Upon the top of the valve-body is the usual cylindrical extension F, having the packing-nut G at the top and through which the stem H, having suitable handle H', is adapted to pass. The stem has a shoulder $a$ just below the washer $b$, which is seated in an annular recess $d$ in the upper end of the cylindrical extension F, this washer forming the bottom of the packing chamber within the nut G. The shoulder $a$ presses upon the washer $e$, which in turn presses upon the spring $h$. At the lower end this spring bears upon a washer $i$, which in turn rests upon a packing $k$, preferably of rubber or other expansible material, which rests upon the inwardly-extending flange or shoulder $l$, formed at the juncture of the body of the casing and the extension F. The steam projects into the body and into an aperture in the top of the tapering plug I, the plug being provided with the downward-extending cylindrical portion J, through which and through the stem I passes a cotter-pin K to hold the stem and the plug together.

The plug is tapered and hollow, as shown, and at one side it has the port K', and its lower end is open, forming an induction-port L.

Extending inwardly from the shell of the casing in line with the upper and lower faces of the eduction-passage I form the segmental flanges M and M' of different radius, and upon the opposite side of the casing I form the backing-lugs N and N'. Extending vertically between the ends of the segmental flanges M and M' are the vertical flanges O and O'. The inner faces of the flanges M M' and N N' form a seat for the tapering plug I.

The parts being thus constructed, their operation is as follows: The tension of the spring $h$ acting on the stem H will move the plug I upward and hold it in close contact with its seat on the flanges described. The valve may be opened and closed in the usual manner of opening and closing plug-cocks by turning the plug about a quarter-rotation and either causing the port K' to register with the eduction-opening or to turn the imperforated portion of the plug opposite the eduction-passage.

In case it is desired to relieve the plug from its seats the operator simply pushes down upon the handle H', compressing the spring $h$ and moving the plug downward, which will free it from contact with the flanges and allow the water from the passage into the induction-nipple to pass between the plug and its seats and thoroughly wash them out. Then when the pressure on the plug is released the spring will again lift the plug to its seats and hold it in contact therewith. It will be observed that by forming the flanges which extend inwardly from the body of the casing and forming the seat for the plug in these flanges there is a water-passage P around the plug, which is flushed by the water flowing therethrough every time the valve is opened or closed, and to prevent the water in such passage from remaining therein when the valve is closed I provide the openings or spaces Q and R in the inwardly-extending flanges at the top and bottom, so that the space around the plug and within the casing will be thoroughly drained.

By making a tapering plug having bearings for only a portion of its surface—as, for instance, at top and bottom with a waterway between—I not only greatly reduce the friction and the power required to operate the valve, but I greatly reduce the possibility of sediment collecting on the seats against which the plug rests, and by making the plug movable in the manner I have described any slight accumulation of sediment that may occur is easily washed off or broken off by vertically reciprocating the plug, at the same time allowing the water to flow between the seats and the plug. In case a reciprocating valve were used with a solid seat the whole length of the plug, it is practically impossible to clean out the sediment that may collect or to maintain with some waters a tight joint, while I find with the plug having only small seats at top and bottom and which can be reciprocated that this trouble is overcome.

By having the rubber packing $k$ beneath the washer $i$ the packing-nut G may be taken out and the upper packing replaced with little danger of the valve leaking, because the packing $k$ will make a tight joint between the lower portion of the stem and the body. I thus in effect obtain a double-packed stem with this simple construction.

I provide the plug with any suitable stops to stop the plug in its opened and closed positions. I have shown a lug $r$ on top of the plug adapted to strike the stops $p$ at opposite sides of the stem, which in this case I have shown as located above the upper flange of the upper seat for the flange. Any other means of stopping the valve may be employed and still come within the spirit of my invention if the other features described are employed.

What I claim as my invention is—

1. The combination of a body-casing, an eduction-port and induction-port, inwardly-extending segmental flanges at the top and bottom of the eduction-port, vertical flanges connecting these segmental flanges, flanges at the top and bottom of the body opposite the said segmental flanges acting as backing-flanges for the plug, a hollow ported tapering plug seated in bearings in the flanges, spaces or ports in the backing-flanges, and a passage around the plug between the top and bottom flanges and a stem for rotating the plug.

2. The combination of a body-casing, an eduction-port and induction-port, inwardly-extending segmental flanges at the top and bottom of the eduction-port, vertical flanges connecting these segmental flanges, flanges at the top and bottom of the body opposite the said segmental flanges acting as backing-flanges for the plug, a hollow ported tapering plug seated in bearings in the flanges, spaces or ports in the backing-flanges, and a passage around the plug between the top and bottom flanges, and a stem for rotating the plug.

3. The combination of a body-casing having an eduction-port and an induction-port, inwardly-extending flanges in the body at the top and bottom of the eduction-port, a tapering plug, bearing at the top and bottom against said flanges, and a stem secured to said plug, a spring acting to hold said plug to its seat, and means exterior of the valve-casing by which said plug may be moved longitudinally to compress said spring and away from its seats.

4. The combination of a body, having inlet and outlet ports, a tapering, hollow, ported plug therein, bearings in the casing for the plug at the top and bottom, having a passage within the body between the bearings, a spring for holding the plug to its seat, and a stem by which the plug may be reciprocated for the purpose described.

5. The combination of a valve-body having inlet and outlet ports, a tapering, hollow, ported plug therein, bearings in the body at top and bottom of the plug the body intermediate the bearings being free from the plug, a stem for the plug, by which it may be longitudinally reciprocated and a spring for normally holding the plug to its seats.

In testimony whereof I affix my signature in presence of two witnesses.

FREDERICK W. HODGES.

Witnesses:
H. C. SMITH,
JAS. P. BARRY.